(No Model.)
J. LEES, Jr.
DUST PAN.
No. 472,371.  Patented Apr. 5, 1892.
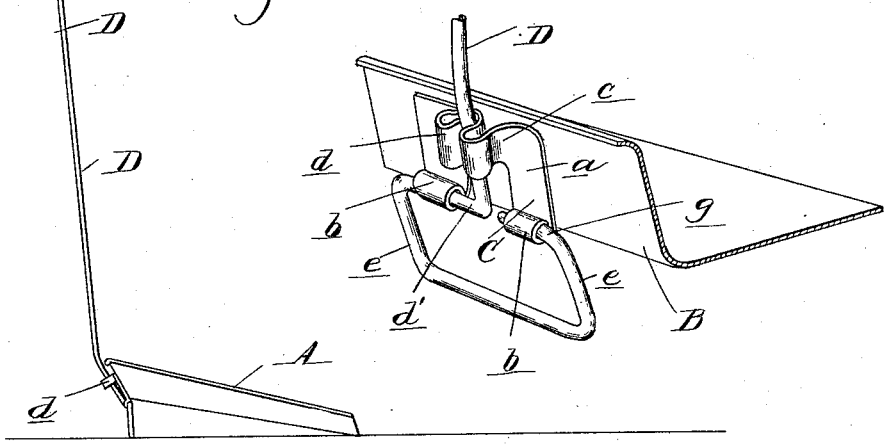
Witnesses
A. L. Habbie
M. B. O'Dogherty
Inventor
John Lees, Jr.
By Mt. S. Spragne
Attys.

UNITED STATES PATENT OFFICE.

JOHN LEES, JR., OF ADRIAN, MICHIGAN, ASSIGNOR OF ONE-HALF TO ERNEST T. LUDECKE, OF SAME PLACE.

DUST-PAN.

SPECIFICATION forming part of Letters Patent No. 472,371, dated April 5, 1892.

Application filed January 4, 1892. Serial No. 416,968. (No model.)

*To all whom it may concern:*

Be it known that I, JOHN LEES, Jr., a citizen of the United States, residing at Adrian, in the county of Lenawee and State of Michigan, have invented certain new and useful Improvements in Dust-Pans, of which the following is a specification, reference being had therein to the accompanying drawings.

This invention relates to new and useful improvements in dust-pans; and the invention consists in the peculiar construction of a handle or holder for a dust-pan, to which the dust-pan is hinged, in combination with a spring-catch by means of which the dust-pan is locked to the handle to prevent its turning on the hinge or to be disengaged therefrom when desired to empty the contents from the pan.

The invention further consists in the peculiar construction of the bracket on the pan forming the hinge and spring clamp or catch, and, further, in the peculiar construction of the handle, whereby it is extended beneath the pan to form the supporting-legs to give the pan the proper incline when in use, and, further, in the peculiar construction, arrangement, and combination of the various parts, all as more fully hereinafter described.

In the drawings, Figure 1 is a side elevation of a dust-pan embodying my invention, showing it in position ready for use on the floor. Fig. 2 is a vertical central section of such a pan on an enlarged scale, showing it in position when turned on its hinge to empty the dust. Fig. 3 is an enlarged detached perspective view of the bracket and lower end of the handle. Fig. 4 is an enlarged detached perspective view showing the construction of the bracket and the manner of forming the hinge and spring-clamp.

A is a dust-pan of ordinary construction having the back B, to which I secure a bracket C. This bracket I preferably form from a single piece of sheet metal, and consists of the two legs $a$, at the lower end of which the eyes $b$ are formed by bending the metal, as shown in Fig. 4, a cross-piece $c$ connecting these two legs at their upper ends. This cross-bar is of sufficient length, so that it may be formed into a spring-clamp $d$, having two spring-lips on opposite sides for the purpose more fully hereinafter described. This bracket I secure to the back wall B of the dust-pan.

D is a handle of any suitable construction, but preferably formed from a single piece of wire, with the lower end shaped in such a manner as to engage in an eye $b$ and forming a hinge between the pan and the handle with a vertical portion $e$ engaged between the eyes $b$ and in line with the opening in the spring-clamp. The manner of forming the lower end of this handle is preferably that shown in the drawings, in which it is bent to have the horizontal portion $d'$ engaged in one of the eyes $b$, the two vertical portions $e$, connected by the horizontal portion $f$, forming a leg depending below the hinge when the handle is in its vertical position and the inwardly-extending horizontal portion $g$, engaging in the other eye $b$. In this way I form the handle integral with the leg or support for the pan when in position to be used to collect the dust, as shown in Fig. 1. When in this position, the vertical portion D will engage between the spring-clamp and hold the dust-pan at right-angles, or substantially so, with the handle, so that it may be carried with the dust therein to any desired place, and then by pressing down on the outer end of the opening the spring-catch will become disengaged and the pan be free to turn upon its hinge and be emptied.

What I claim as my invention is—

1. In a dust-pan, the combination, with the back of a bracket secured thereon having horizontal eyes formed in its lower edge and formed at its center into two loops constituting a spring-pocket between, of a handle having a right-angle extension on its lower end passing through one of the eyes on the bracket and bent down across and up to and through the other eye of the bracket, substantially as described.

2. In a dust-pan, the combination, with the back, of a bracket consisting of two side members extending down to a point slightly below the bottom of the pan and bent to form horizontal eyes, and a connecting-bar between the two side members, bent out into two corresponding loops to form a pocket between the bracket, being attached directly to the back of the pan, and a handle having its lower end formed with a rectangular frame, the upper bar of which is passed through the eyes of the bracket, and the handle portion arranged in alignment with the pocket in the bracket, substantially as described.

In testimony whereof I affix my signature in presence of two witnesses.

JOHN LEES, Jr.

Witnesses:
M. B. O'DOGHERTY,
N. L. LINDOP.